United States Patent [19]

Focke

[11] Patent Number: 5,848,519
[45] Date of Patent: Dec. 15, 1998

[54] APPARATUS FOR TRANSMITTING FORCES IN CONJUNCTION WITH PACKAGING MACHINES, IN PARTICULAR

[75] Inventor: Heinz Focke, Verden, Germany

[73] Assignee: Focke & Co. (GmbH & Co.), Verden, Germany

[21] Appl. No.: 671,612

[22] Filed: Jun. 28, 1996

[30] Foreign Application Priority Data

Jul. 4, 1995 [DE] Germany ................. 195 23 681.5

[51] Int. Cl.⁶ .......................... B65B 19/24; B65B 65/00
[52] U.S. Cl. ............................................. 53/575; 53/234
[58] Field of Search ............................ 53/575, 574, 234, 53/232, 228, 225

[56] References Cited

U.S. PATENT DOCUMENTS

| | | | |
|---|---|---|---|
| 3,868,193 | 2/1975 | Schott ..................................... | 403/344 |
| 4,852,335 | 8/1989 | Focke et al. ............................. | 53/575 |
| 5,024,046 | 6/1991 | Spatafora et al. ...................... | 53/234 X |
| 5,392,586 | 2/1995 | Imai ......................................... | 53/234 |

FOREIGN PATENT DOCUMENTS

| | | |
|---|---|---|
| 687694 | 1/1940 | Germany . |
| 2259193 | 6/1974 | Germany . |
| 3024553 | 1/1981 | Germany . |
| 617998 | 2/1949 | United Kingdom . |
| 689016 | 3/1953 | United Kingdom . |
| 1421268 | 1/1976 | United Kingdom . |

*Primary Examiner*—James F. Coan
*Attorney, Agent, or Firm*—Sughrue, Mion, Zinn, Macpeak & Seas, PLLC

[57] ABSTRACT

In the event of the transmission of forces or movements of drive members with a circular cross-section and connection members, in particular actuating levers (11), provided on said drive members, a non-round configuration is provided, in order to secure a precise relative position of the members, in a region where the actuating lever (11) is mounted on a shaft or the like. The shaft or a shaft end is provided with a flattened portion A bore (13) in the actuating lever (11) has a mating flattened portion (19) which corresponds therewith. This produces a precise relative position between the actuating lever (11) and the shaft or the like, said relative position not requiring any adjustment or measuring work and also being ensured in the event of repeated assembly.

4 Claims, 4 Drawing Sheets

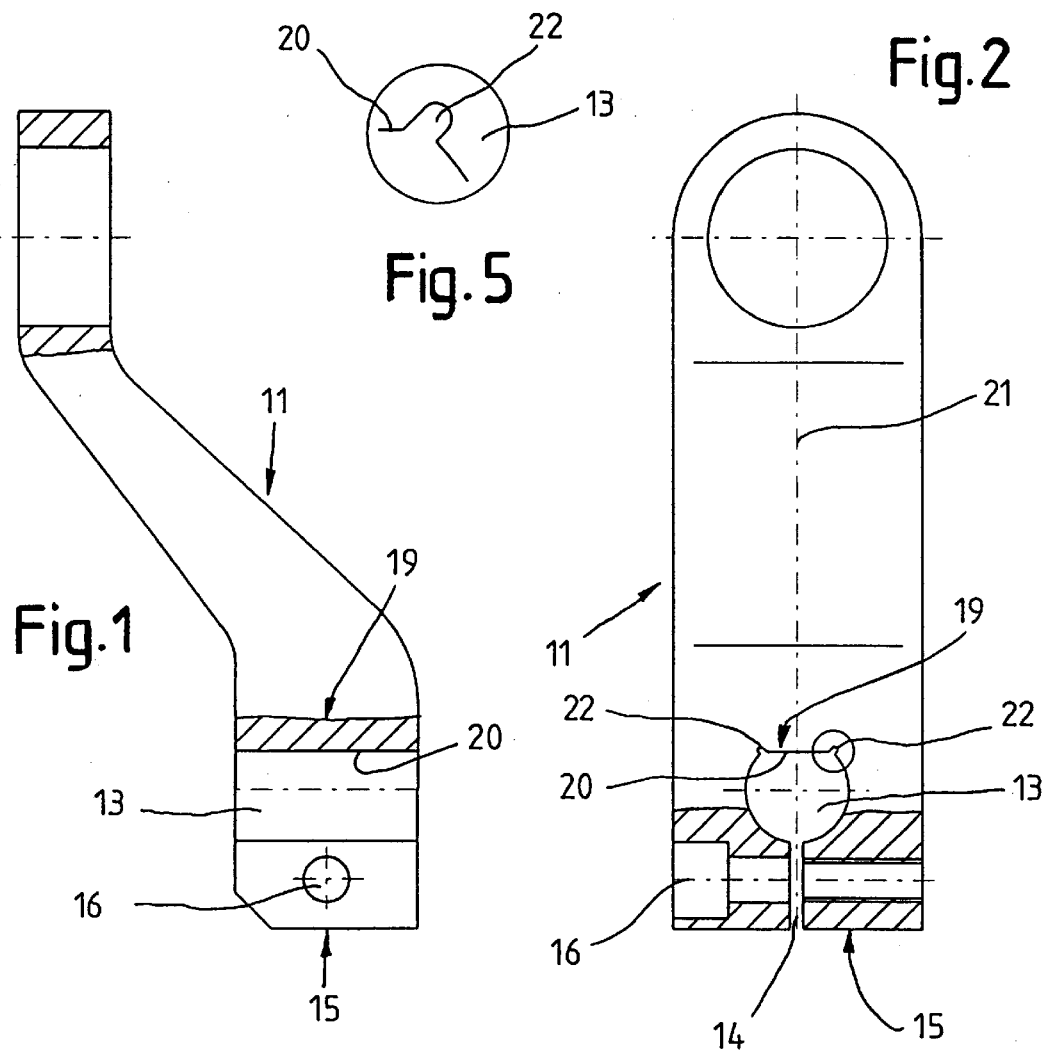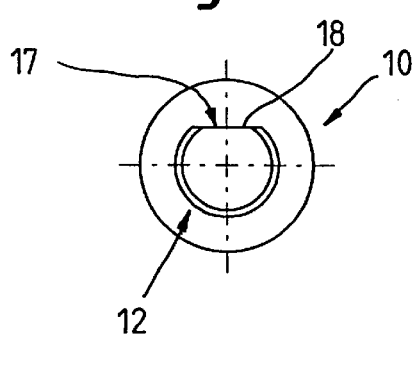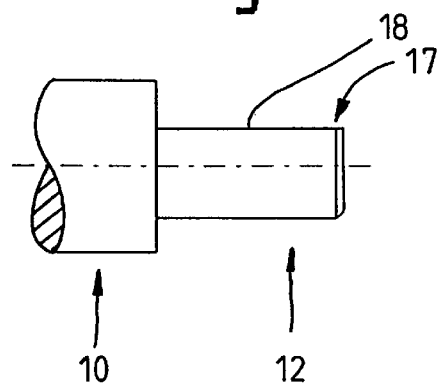

APPARATUS FOR TRANSMITTING FORCES IN CONJUNCTION WITH PACKAGING MACHINES, IN PARTICULAR

BACKGROUND OF THE INVENTION

The invention relates to an apparatus for transmitting forces in conjunction with machines, in particular packaging machines, comprising a first movable member with a circular or cylindrical cross-section, in particular a shaft, push rod or the like, and having a second member, e.g. an actuating lever, pusher head or the like, which is fastened on the first member in a transversely directed relative position or eccentrically, the first member fitting in an opening or bore or a bearing of the second member.

In machines for different application areas, preferably in packaging machines, forces and movements are transmitted to other machine members by levers, shafts, push rods, etc. On account of the accuracy, the movements are controlled predominantly with the aid of cam discs or cam grooves, sensing rollers which are connected to the members running on said cam discs or in said cam grooves.

The invention is concerned with expedient connection of members such as (drive) levers, take-along or pusher members, holders for packs, etc. to round, namely cross-sectionally circular, that is to say cylindrical shafts, rods, spindles, etc.

On the one hand, the concern is to solve a specific problem, namely, in the event of assembly of the machines or in the event of the connection of the round, cylindrical members to the (second) members assigned thereto, to reduce the work done by fitters for determining the precise relative position, without, however, thereby dispensing with accuracy as regards the relative position.

In particular in the case of packaging machines, it is important that the members which are connected to one another for transmitting forces, namely round or cylindrical members, on the one hand, and, on the other hand, members which are arranged eccentrically, offset with respect to the first, have a precise relative position. This complicates the initial assembly of the machine and subsequent assembly work which may be due later during repair work and other interruptions in operation. The specific problem with packaging machines is that folding and transporting turrets are usually equipped with a multiplicity of coinciding groups of members, which multiply the assembly outlay.

The problem which is to be solved by the invention is to ensure precise angular or relative positioning of the interconnected first and second members, the first member having a circular cross-section in the region of connection to the second member.

In order to solve this problem, the invention proposes that, in the region of connection to the second member, the first member (cylindrical shaft, rod or the like) has a non-round cross-section, in particular a flattened portion with a planar adjustment surface, and that the second member has a correspondingly designed opening or bore or a corresponding bearing with a cross-section which corresponds to the first member, such that, in the event of repeated separation and reassembly of the members, the mutually corresponding flattened portions or other non-round cross-sectional shapes of the two members always ensure a predetermined relative position of the two members with respect to one another.

This measure ensures a positively locking connection aligned with the precise desired position, between the inherently round members and the members fastened thereon.

The regions which correspond with one another in a positively locking manner, namely the bearing surfaces of the cylindrical members, on the one hand, and the bearing surfaces which enclose these and are located in bearing eyelets, bores or openings, have to be worked precisely, with the result that they fit precisely with respect to one another and ensure the precise relative position without reworking. Mutually corresponding flattened portions are particularly advantageous here.

Packaging machines, for example those for the production of soft-carton packs for cigarettes, require precise relative positions, which also have to be ensured in the event of repeated dismantling and assembly. Pressing-on members for pressing blanks onto folding mandrels of a folding turret are controlled via cam discs with sensing rollers (U.S. Pat. No. 4,852,335).

According to the invention, the actuating lever is part of a four-bar linkage, which moves the pressing-on member in accordance with the fixed cam disc during rotation of the folding turret. In the event of a transmission of movements by four-bar linkages, a precise relative position between an actuating lever of the linkage, on the one hand, and the shaft driving this, on the other hand, is particularly important.

A further, similar example for the application of the invention is the connection between a cylindrical push rod and a pusher head or a pusher plate, the intention being that said (second) members always assume a precise angular position on the push rod in the event of repeated assembly. In this arrangement, the movement of the push rod is controlled by a cam disc via sensing rollers.

Further features of the invention relate to design details of the self-adjusting connection between the members and to application examples. The latter are represented in the drawings, in which, in detail:

BRIEF DESCRIPTION OF THE EMBODIMENTS

FIG. 1 shows, partially in section, an actuating lever as an example of a "second" member FIG. 2 shows an elevation of the actuating lever according to FIG. 1, FIG. 3 shows an end region of the shaft as "first" member, FIG. 4 shows an elevation of the end region of the shaft according to FIG. 3, FIG. 5 shows, on a vastly enlarged scale, a detail of the actuating lever according to FIG. 2, FIG. 6 shows a vertical or radial section of details of a folding turret for cigarette packs having a first and second member, FIG. 7 shows an axial view of a detail of a folding turret for a packaging machine, and FIG. 8 shows, on an enlarged scale, a detail of the folding turret according to FIG. 7.

DESCRIPTION OF THE PREFERRED EMBODIMENTS

Figure 6:
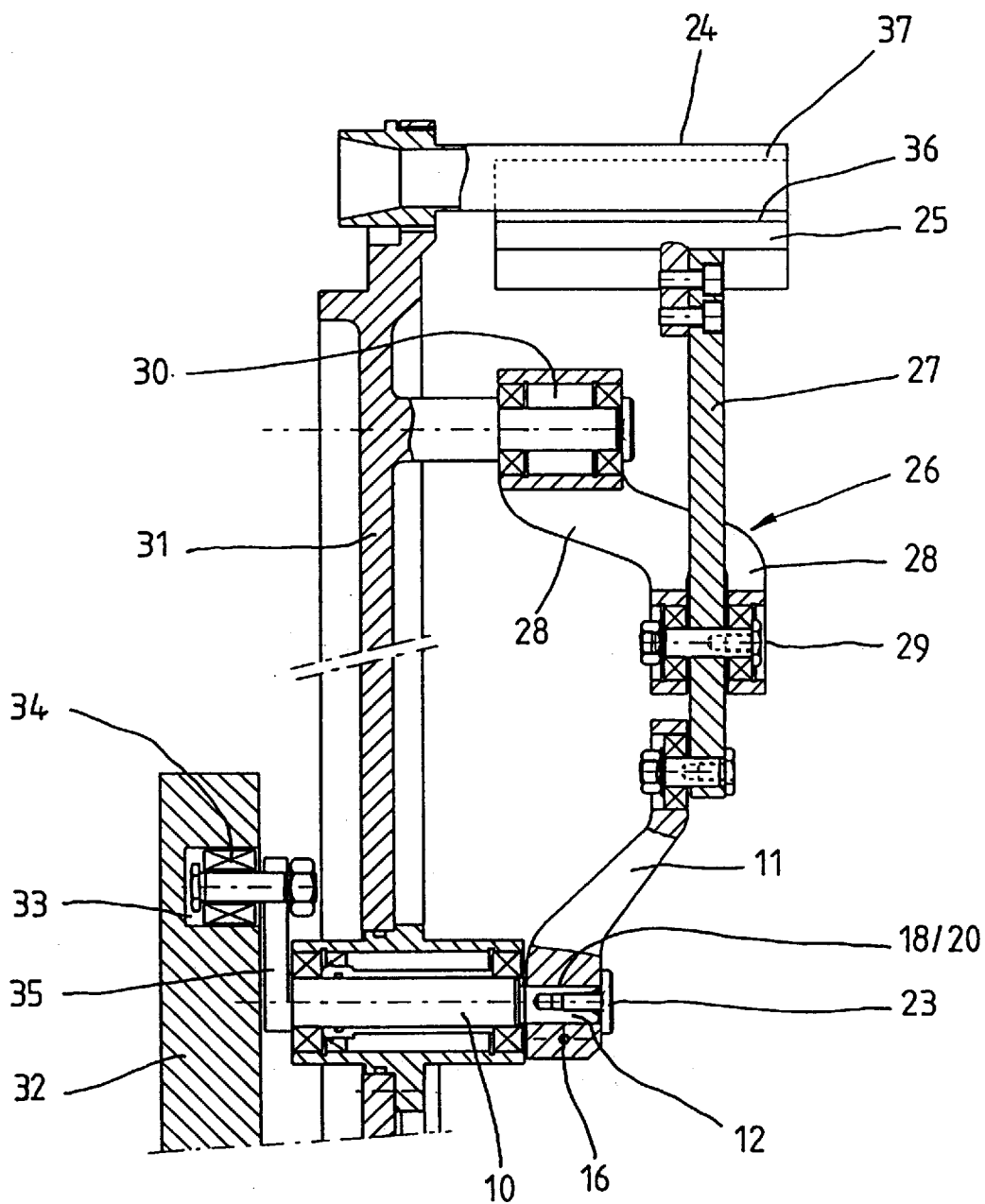

FIGS. 1 to 5 show an exemplary embodiment for the connection of a first and second member. The first member is a shaft 10. A (single-armed) actuating lever 11 is connected, as second member, to said shaft. The shaft 10 has a circular cross-section, that is to say it is of an overall cylindrical design. The actuating lever 11 is mounted on the shaft 10, in an end region of the same, and fixed in a relative position. The end region of the shaft 10 which receives the actuating lever 11 is designed with a smaller diameter than the rest of the shaft 10, this resulting in an offset shaft end 12. The length of said shaft end 12 corresponds to the width of the actuating lever (dimension in the axial direction) in the region where the latter is mounted on the shaft 10.

The actuating lever 11 is provided at one end with a bore 13 or a bearing eyelet. The shaft end 12 is fixed in said bore 13. In the present exemplary embodiment, the shaft 10 and actuating lever 11 are connected to one another by clamping. The bore 13 of the actuating lever 11 thus has a central slit 14 leading to it, to be precise starting from an end-side transverse surface 15 of the actuating lever 11. This means that two clamping parts are produced in said end region of the actuating lever 11, these clamping parts, in the assembled position, being pressed together by a clamping screw 16 such that the actuating lever 11 is connected to the shaft 10 or to the shaft end 12 by clamping forces.

The practical application of said geared connection of the shaft 10 and actuating lever 11 makes it necessary to ensure that the actuating lever 11 is in a precise relative position transverse to the shaft 10, which relative position is reproduced precisely even in the event of repeated assembly.

For this purpose, the shaft 10 or the shaft end 12 has a non-round cross-section (FIG. 4). The shaft end 12 is provided with a flattened portion 17 on one side which coincides with the position of the actuating lever 11. This produces a planar adjustment surface 18 at the shaft end 12, to be precise, in this case, over the entire length of said shaft end.

The bore 13 or opening in the actuating lever 11 is dimensioned and shaped to match precisely the non-round cross-section of the shaft end 12. Accordingly, the bore 13 has a coinciding mating flattened portion 19 with an abutment surface 20 which corresponds with the adjustment surface 18 of the shaft end 12.

Every time the shaft 10 and actuating lever 11 are assembled, the latter assumes a precise relative position, namely angular position, with respect to the shaft 10 without any measurement or control being necessary, to be precise this occurs by the abutment surface 20 butting against the adjustment surface 18. The relative position is such that the abutment surface 20 of the actuating lever 11 is directed centrally, namely transversely, with respect to an imaginary longitudinal center plane 21 of the actuating lever 11. Accordingly, the abutment surface 20 is located precisely on the side which is located opposite the slit 14.

The bore 13 can be produced in this cross-sectional shape in various ways. Advantageously, the work is carried out in accordance with the erosion process, which is known for other application purposes. In this case, a wire under a high electric voltage is guided through the metal, along the contour of the bore 13. The erosion wire can be introduced from the outside via the slit 14.

Corner formations 22 are configured in a particular manner, namely on transition from the planar abutment surface 20 into the remaining, circular region of the bore 13. Here, the erosion wire is guided out of the contour of the bore 13 to a slight extent, a depression being formed in the material in the process (FIG. 5). This permits precise positioning of the corners or edges as lateral boundary of the adjustment surface 18 in the bore 13.

In order further to secure the actuating lever 11 on the shaft end 12, use is made of an axial screw 23 which enters, from a free end surface of the shaft end 12, into the latter in an axially central manner and holds the actuating lever 11 with a correspondingly dimensioned screw head.

The abovedescribed unit comprising the shaft 10 and actuating lever 11 may expediently be utilized in a folding turret for the manufacture of soft packs for cigarettes (U.S. Pat. No. 4,852,335). In such a packaging machine, a folding turret is provided with a plurality of folding mandrels 24 distributed along the outer circumference. The folding mandrels 24 are hollow bodies which project on one side and have blanks folded around their outer surface for the formation of the soft-carton pack. In a first folding section, an inner blank, usually made of paper or tinfoil, is folded around the folding mandrel. Thereafter, a blank made of paper is folded, as the soft carton, around the folding mandrel or around the inner blank fashioned thereon.

The drawings present improved solutions, in relation to the prior-art design according to U.S. Pat. No. 4,852,335, for temporarily fixing the blanks on the outer circumference of the folding mandrel 24 and for carrying out the folding steps. According to FIG. 6, a pressing-on member 25 is actuated by a four-bar linkage 26, namely it is moved, in the direction of an associated folding mandrel 24, until it butts against the latter and is then moved back into an initial position. The four-bar linkage 26 is assigned the actuating lever 11 for controlled movement. The four-bar linkage 26 comprises a main lever 27, which is connected to the pressing-on member 25, the actuating lever 11, which is articulated at the free end of said main lever 27, and an additional supporting lever 28. The latter is connected pivotably to the main lever 27 via a first articulation bearing 29 and is mounted in a stationary manner via a second articulation bearing 30, in the present case on a turret disc 31 which revolves with the folding turret. The supporting lever is bent in shape, such that its stationary articulation bearing 30 is located in the same plane as the bearing formed on the shaft end 12 by the actuating lever.

The abovedescribed four-bar linkage 26 is configured as a double rocker. The actuating lever 11 is a driving crank. Supporting lever 28 functions as a rocker arm. The main lever 27, which connects the driving crank or the actuating lever 11 to the rocker arm or supporting lever 28, forms the coupling of this drive. The driving crank or the actuating lever 11 is connected to the roller lever of a cam gear via a shaft, namely shaft 10. The special configuration consists in the releasable, torsion-proof and positive connection between the shaft 10 and the driving crank or the actuating lever 11.

It is important for these relationships that the movements of the actuating lever 11 and of the four-bar linkage 26 can be controlled by a fixed cam disc 32. The latter is provided with a closed control groove 33 running around it. A sensing roller 34 enters into the control groove 33. The movements of said roller are transmitted, via a crank lever 35, to the shaft 10 and, from the latter, the actuating lever 11.

A folding turret which has a multiplicity of folding mandrels along the outer circumference (FIG. 7) is necessary for efficient packaging machines for producing soft packs for cigarettes. Each of said multiplicity of folding mandrels 24 is assigned a pressing-on member 2 5 and, accordingly, the actuating linkage, that is to say, in the present case, a four-bar linkage 26.

The pressing-on member 25 is designed in a particular manner, such that it fulfills a double function. To be precise, it serves to rest a blank (not shown) against the outer circumference of a folding mandrel 24, the blank being folded simultaneously. For this purpose, the pressing-on member 25 is designed to be angular in cross-section, with two legs 36 and 37 directed at right angles with respect to one another. Said legs are assigned to a radially inner wall 38 and a narrow, virtually radially directed side wall 39 of the folding mandrel 24. Accordingly, the blank gripped by the pressing-on member 25 is pressed, by the leg 36, onto the inwardly oriented, large-surface-area wall 38 and, by the transversely directed leg 37, onto the narrow side wall of the folding mandrel 24, the blank being folded correspondingly. In this arrangement, the blank is folded in the region of a radially inner longitudinal edge 40 of the folding mandrel 24, said edge being at the rear in the direction of rotation, and is fixed over a certain transporting section.

Figure 7:
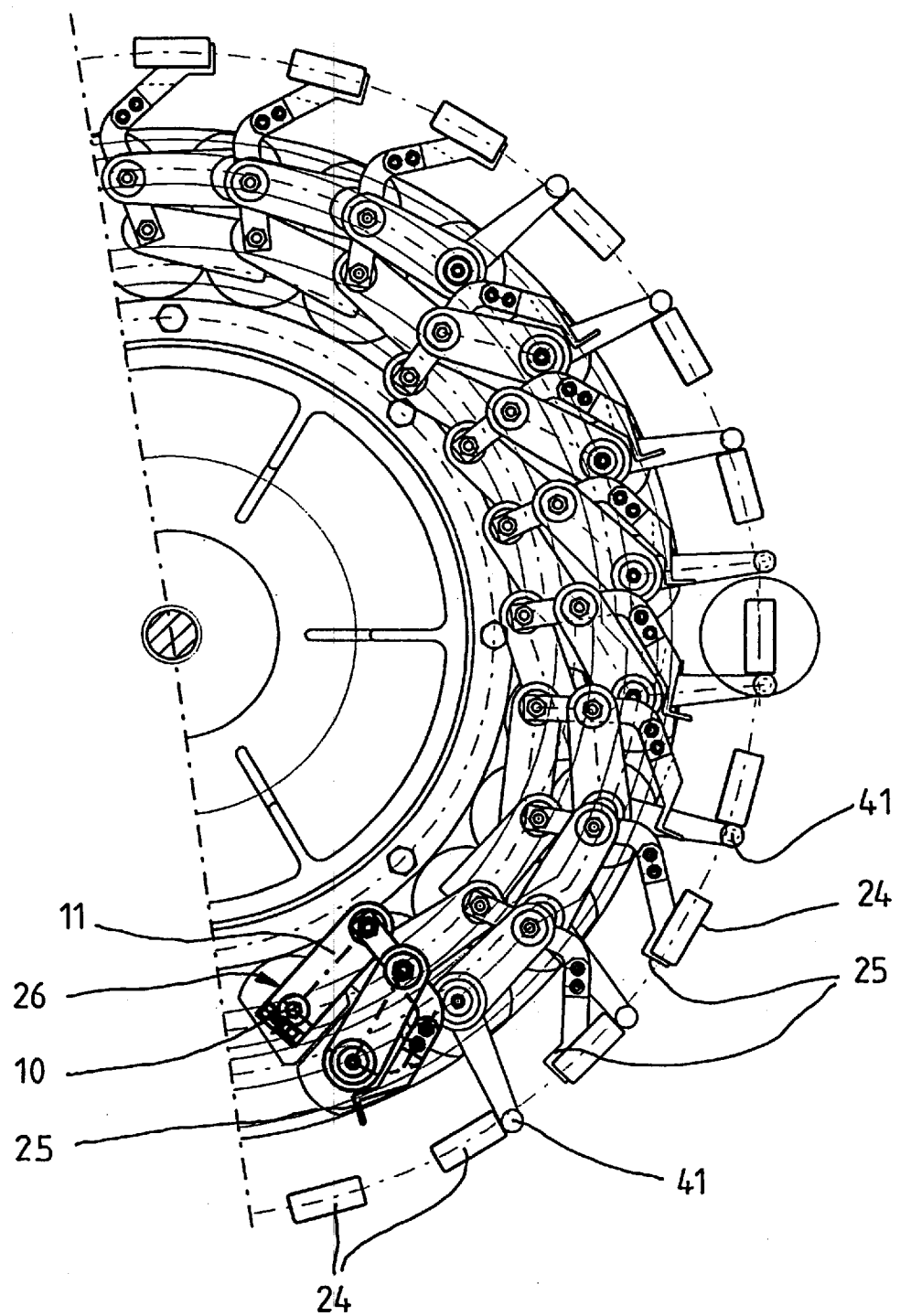
Figure 8:
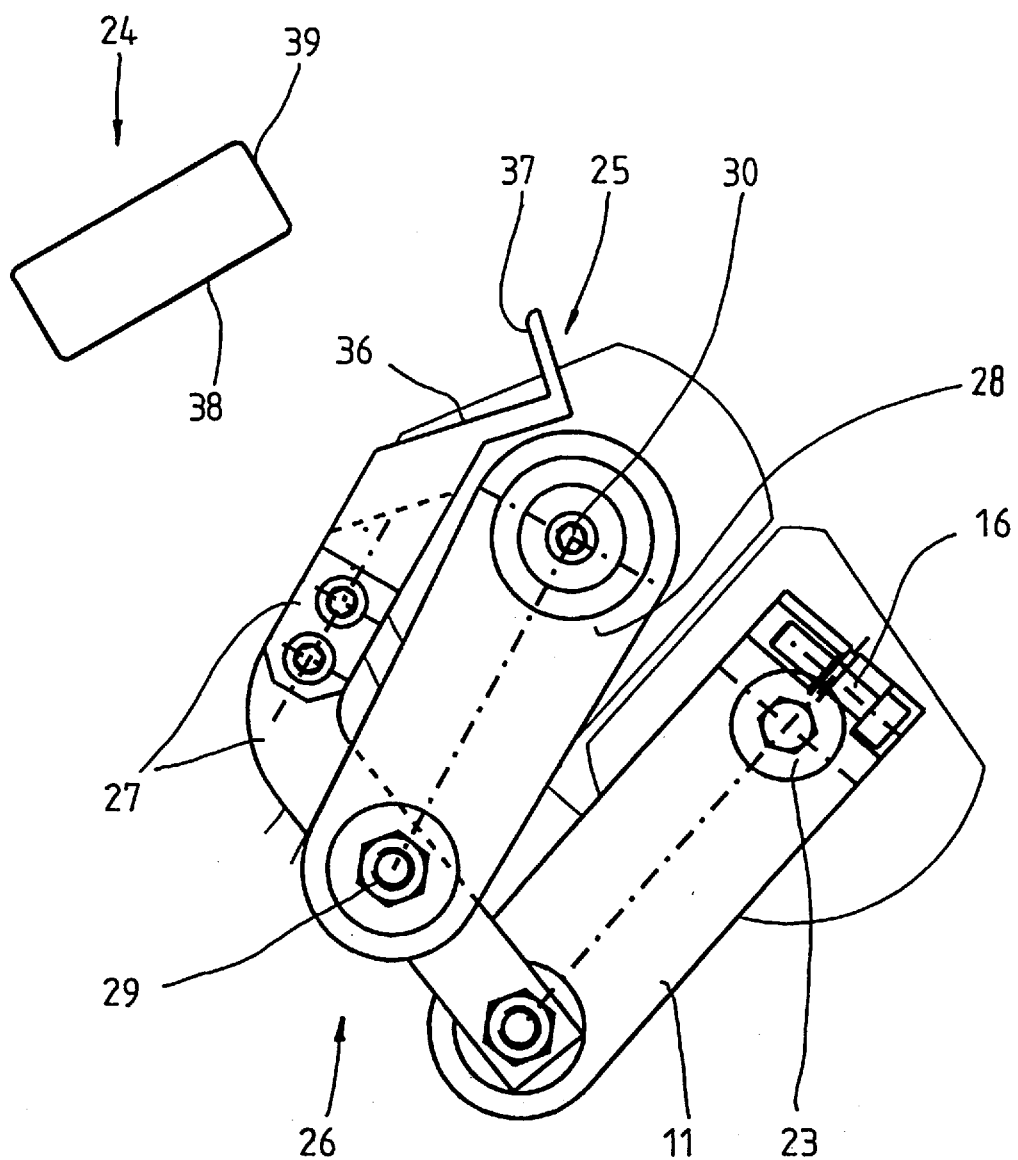

In order to execute said folding and pressing-on movement of the pressing-on member 25, the actuating linkage, in the present case the four-bar linkage 26, moves the pressing-on member 25 radially outwards from a position in which it is drawn back in the radial direction of the folding turret (at the bottom of FIG. 7). The movement sequence is translatory. This means that the legs 36, 37 are moved parallel to the wall 38 and side wall 39 until they rest against the folding mandrel 24. In the initial position (FIG. 8 and the bottom of FIG. 7), the pressing-on member 25 is positioned to be offset with respect to the associated folding mandrel 24. The pressing-on movement takes place in the direction of the longitudinal edge 40.

In the exemplary embodiment shown, a blank is carried along in each case by a folding mandrel 24 by the rotary movement of the folding turret, to be precise it is carried along on the side which is at the front in the direction of rotation, with respect to the side wall 39. In this region, first of all a holding member 41 fixes the blank, which has been folded in the form of a U. The folding tabs of the blank which project to the rear in the conveying direction are then gripped in the described manner by the pressing-on member 25 and pressed onto the folding mandrel 24, angular folding being carried out in the process. Thereafter, the further folding steps take place on the folding mandrel 24, in particular in the manner described in U.S. Pat. No. 4,852, 335.

What is claimed is:

1. An apparatus for transmitting forces in conjunction with packaging machines, said apparatus comprising a first member (10) with a circular cross-section, and a second member (11) having a bore hole (13) in which the first member is anchored at an end region thereof, wherein:

a) said end region of the first member (10) has a first flattened portion (17) defining a level adjusting surface (18);

b) said bore hole (13) has a second flattened portion (19) matching the first flattened portion (17) which closely fits and mates with said second flattened portion (19);

c) said second member (11) is provided, on an end opposite said second flattened portion (19), with an open continuous slit (19) which extends longitudinally to said bore hole (13); and d) said second member (11) is provided with a clamping screw (16) which extends transversely to said longitudinally extending slit (14) in such a manner that a tightening of the clamping screw (16) produces a corresponding deformation of the bore hole (13), thus causing said flattened first portion (17) of said first member (10) to be pressed against said second flattened portion (19) of said bore hole (13).

2. The apparatus according to claim 1, wherein said second flattened portion (19) in said bore hole (13) of said second member (11) is aligned transverse to a longitudinal center plane of said second member (11).

3. The apparatus according to claim 1, wherein:

a) said second member is an actuating lever (11) forming part of a four-bar linkage (26) having a main lever (27);

b) said actuating lever (11) is arranged with one end thereof on said first member (10);

c) the other end of said actuating lever (11) is articulated to said main lever (27) which has a free end that is attached to a pressing-on member (25) which is adapted to press a blank of a pack onto a folding mandrel (24) of a folding turret of one of the packaging machines; and d) a supporting lever (28) is pivotably connected at one end thereof to said main lever (27) by a first bearing (29), the other end of said supporting lever (28) being mounted in a second bearing (30).

4. The apparatus according to claim 3, wherein the pressing-on member (25) is angular in cross-section and has two legs (36, 37), arranged at right angles with respect to one another, for pressing the blank onto a radially inner wall (38) and onto a side wall (39), which is directed transversely with respect to said inner wall, of the folding mandrel (24) by translatory movement of the pressing-on member (25).

* * * * *